UNITED STATES PATENT OFFICE.

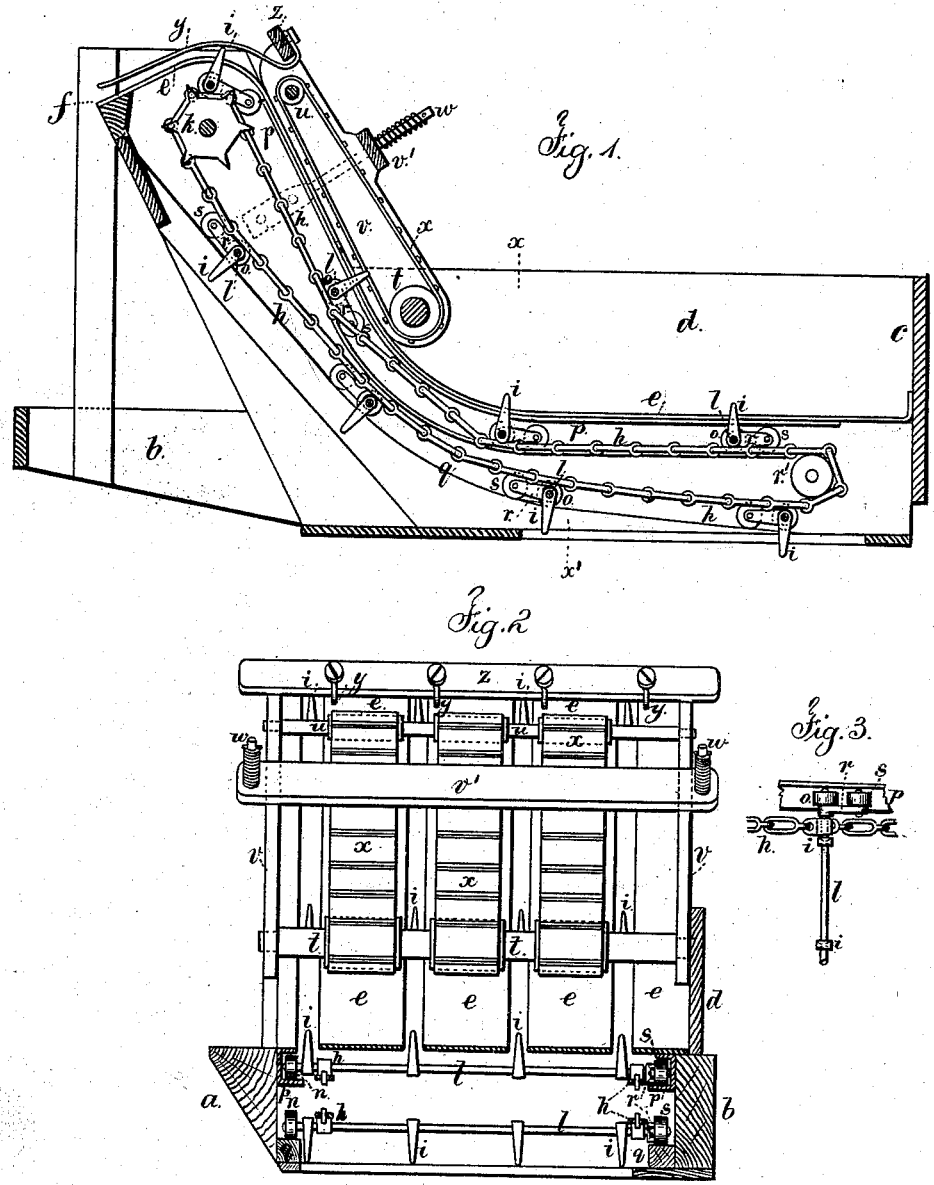

EDWIN CHAPMAN, OF ROCHESTER, MINNESOTA, ASSIGNOR TO CHAPMAN BINDER COMPANY, OF SAME PLACE.

IMPROVEMENT IN ELEVATORS FOR HARVESTERS.

Specification forming part of Letters Patent No. 214,811, dated April 29, 1879; application filed September 25, 1878.

*To all whom it may concern:*

Be it known that I, EDWIN CHAPMAN, of Rochester, in the State of Minnesota, have invented an Improvement in Elevators for Harvesters, of which the following is a specification.

The object of this invention is to convey the grain from the platform of the harvester to the portion of the machine where it is formed into bundles.

Chains have before been employed for this purpose. My improvement relates to a peculiarity in the construction of the chain, whereby it is capable of being drawn along level, or nearly so, and then up an incline, and I employ a self-adjusting presser for holding the grain to the elevator-teeth while being drawn up the incline.

By my improvement the elevating mechanism is rendered very compact, and risk of obstructions in the movement avoided.

In the drawings, Figure 1 is a section of the elevating apparatus longitudinally. Fig. 2 is a transverse section of the same at the line $x'$ $x'$; and Fig. 3 is a partial plan of a rake-bar, crank-arm, rollers, and chain.

The platform upon which the grain falls is provided with the frame $a\ b$, side fence, $c$, and back fence, $d$, and there are plates $e\ e\ e\ e$ extending longitudinally of the platform from the fence $c$, and rising at an inclination and terminating at $f$, where the grain is delivered for binding. These plates $e$ form the rests or supports for the grain as it is moved along from the place where it falls to the point of binding, and there are rake-teeth $i$ projecting up through the slots that are between these plates $e$, and said rake-teeth and rakes are moved by endless chains $h$, connected at their ends, and passing around the sprocket-wheels $k$, to which motion is given from the main driving-wheel of the harvester, or in any other convenient manner.

Each rake is composed of a rod, $l$, that extends across from one chain to the other, the teeth $i$ projecting laterally from such rod $l$. There are links introduced in the chains at suitable distances apart with projections, through which the said rod $l$ passes, and at one end of said rod is a roller, $n$, and at the other end of the rod $l$ is a roller, $o$, and also a crank-arm, $r$, carrying a third roller, $s$. The crank-arm is fastened firmly to the rod $l$ at right angles, or nearly so, to the rake-fingers $i$, and there are ledges or tracks $p$ and $q$, upon which the rollers travel with but little friction, and support the chain and rake-teeth, and the track $p$ is double or trough-shaped, so that the rollers $o$ and $s$ and crank-arm are guided as they are moved along, and the teeth of the rake held at right angles to the track, or nearly so.

The tracks at the platform portion of the harvester are level, or nearly so, and then they curve upwardly, and are inclined and correspond to the curvature of the bars $e$; hence the rake-teeth as they move will project above those bars $e$, and convey the grain to the point of delivery. The rakes are returned by the endless chain and pass along the track $q$ to the under side of the roller $r'$, near the fence $c$.

In order to prevent the grain falling off the rake-teeth as it is carried up the incline, I make use of a yielding presser, composed of the rollers $t\ u$, set in the side frames, $v$, that are held in place by a cross-bar, $v'$, that sits loosely over the fixed guide-studs $w$, so that the frame and rollers can be nearer to or farther from the bars $e$, according to the thickness of the mass of grain that is being conveyed up the incline, and there are springs around the studs $w$, to return the parts toward the bars $e$.

Upon the rollers $t\ u$ there are endless belts $x\ x$, extending from one roller to the other, and serving to hold the grain toward the rake-teeth, and it is preferable to have slats or thwarts nailed to the belts, so that the rake-teeth, coming into contact with these, may revolve the belts and turn the rollers. The slats, however, may not extend from belt to belt, but may be arranged as shown in Fig. 2, in which case the belts will be revolved by the ascending grain. By these means the grain is carried in a reliable manner up the inclined portion of the elevator, and delivered beneath the spring-fingers $y$, that extend from the cross-bar $z$ toward the point where the grain is delivered or taken for bundling. The rake-teeth withdraw below the bars $e$ as they are carried around the sprocket-wheels $k$.

I am aware that rake-teeth have been moved by endless chains, and that they have been held upright by sliding blocks, and also by crank-arms and wrists, and also that a platform has been made with a curved surface rising upwardly at one end. In my elevator there is a horizontal platform and an incline, up which the grain is drawn to any height that may be desired for delivery to the binder. If the rods $l$ were not provided with rollers at both ends, the strain upon the chain in consequence of the change of direction from the horizontal to the inclined position would cause the rods to bind in the tracks, so that they could not be moved.

I am also aware that inclined and horizontal belts have been used in conveying the grain to the place where it is formed into bundles.

I claim as my invention—

1. The combination, with the rake-teeth $i$, rod $l$, and endless chains $h$, of the rollers $n$ and $o$ at the ends of the rod $l$, the crank-arm $r$, extending from the rod $l$ near one end, and the roller $s$ upon such arm $r$, and the ledges or tracks $p\ q$, substantially as and for the purposes set forth.

2. In a harvester-elevator, the combination of the bars $e$, passing across the platform and rising at an inclination to the point of delivery of the grain, endless chains $h$, cross-rods $l$, rake-teeth $i$, rollers $n\ o\ s$, crank-arms $r$, and ledges or tracks $p\ q$, that guide the rakes and cause them to convey the grain across the platform and up the incline, substantially as set forth.

3. The combination, with the endless chains, rakes, crank-arms, rollers, plates $e$, and horizontal and inclined tracks, of the rollers $t\ u$, endless belts $x\ x$, and frames $v$, forming a yielding presser, the belts of which are moved by the rake-teeth and grain, substantially as set forth.

Signed by me this 17th day of September, A. D. 1878.

EDWIN CHAPMAN.

Witnesses:
C. H. BLISS,
H. M. NOWELL.